(12) United States Patent
Malasky et al.

(10) Patent No.: US 8,117,623 B1
(45) Date of Patent: Feb. 14, 2012

(54) SYSTEM AND METHOD FOR PROVIDING NOTICES TO USERS OF A COMPUTER PROGRAM IN A FLEXIBLE WAY

(75) Inventors: Ethan Malasky, San Francisco, CA (US); Stephanie Goss, San Francisco, CA (US); Kevin Lynch, San Francisco, CA (US); David Calaprice, San Francisco, CA (US); Alexander Magee, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1645 days.

(21) Appl. No.: 11/282,266

(22) Filed: Nov. 18, 2005

Related U.S. Application Data

(60) Provisional application No. 60/629,454, filed on Nov. 18, 2004, provisional application No. 60/629,455, filed on Nov. 18, 2004, provisional application No. 60/629,503, filed on Nov. 18, 2004.

(51) Int. Cl.
*G06F 9/44* (2006.01)
*G06F 3/16* (2006.01)
(52) U.S. Cl. ......... 719/318; 719/313; 719/329; 715/727
(58) Field of Classification Search .................. 345/538; 715/727, 728; 719/313, 318, 329
See application file for complete search history.

(56) References Cited

U.S. PATENT DOCUMENTS

| | | | |
|---|---|---|---|
| 5,157,763 A | 10/1992 | Peters et al. | |
| 5,301,268 A | 4/1994 | Takeda | |
| 5,555,416 A | 9/1996 | Owens et al. | |
| 5,606,674 A | 2/1997 | Root | |
| 5,625,809 A | 4/1997 | Dysart et al. | |
| 5,694,563 A | 12/1997 | Belfiore et al. | |
| 5,781,192 A | 7/1998 | Kodimer | |
| 5,784,058 A | 7/1998 | LaStrange et al. | |
| 5,801,693 A | 9/1998 | Bailey | |
| 5,835,777 A | 11/1998 | Staelin | |
| 5,886,699 A | 3/1999 | Belfiore et al. | |
| 5,924,099 A | 7/1999 | Guzak et al. | |
| 5,999,740 A | 12/1999 | Rowley | |
| 6,009,274 A | 12/1999 | Fletcher et al. | |
| 6,028,965 A | 2/2000 | Normile | |
| 6,061,058 A | 5/2000 | Owens et al. | |
| 6,067,582 A | 5/2000 | Smith et al. | |
| 6,125,388 A | 9/2000 | Reisman | |
| 6,216,152 B1 | 4/2001 | Wong et al. | |
| 6,272,493 B1 | 8/2001 | Pasquali | |

(Continued)

FOREIGN PATENT DOCUMENTS

WO WO 00/43913 7/2000

(Continued)

OTHER PUBLICATIONS

U.S. Appl. No. 11/280,714, filed Nov. 15, 2005, in Office Action dated Dec. 24, 2009, to be published by the USPTO, 34 pages.

(Continued)

*Primary Examiner* — Charles E Anya
(74) *Attorney, Agent, or Firm* — Fish & Richardson P.C.

(57) ABSTRACT

A system and method provides messages received from a program to a user in an area used for displaying messages from multiple programs. The message may be received with an indication that the user is to be notified upon receipt of the message, however the user can disable or enable such notifications.

15 Claims, 5 Drawing Sheets

U.S. PATENT DOCUMENTS

| | | | |
|---|---|---|---|
| 6,314,565 B1 | 11/2001 | Kenner et al. | |
| 6,321,209 B1 | 11/2001 | Pasquali | |
| 6,378,128 B1 | 4/2002 | Edelstein et al. | |
| 6,418,555 B2 | 7/2002 | Mohammed | |
| 6,434,563 B1 | 8/2002 | Pasquali et al. | |
| 6,535,882 B2 | 3/2003 | Pasquali | |
| 6,557,054 B2 | 4/2003 | Reisman | |
| 6,606,744 B1 | 8/2003 | Mikurak | |
| 6,618,716 B1* | 9/2003 | Horvitz | 706/55 |
| 6,636,856 B2 | 10/2003 | Pasquali | |
| 6,654,765 B2 | 11/2003 | Wong et al. | |
| 6,658,419 B2 | 12/2003 | Pasquali | |
| 6,687,745 B1* | 2/2004 | Franco et al. | 709/219 |
| 6,757,365 B1 | 6/2004 | Bogard | |
| 6,785,885 B2 | 8/2004 | Norris et al. | |
| 6,803,929 B2 | 10/2004 | Hinegardner et al. | |
| 6,839,714 B2 | 1/2005 | Wheeler et al. | |
| 6,904,569 B1 | 6/2005 | Anderson | |
| 6,944,821 B1 | 9/2005 | Bates et al. | |
| 6,961,907 B1 | 11/2005 | Bailey | |
| 7,080,139 B1 | 7/2006 | Briggs et al. | |
| 7,085,817 B1 | 8/2006 | Tock et al. | |
| 7,127,405 B1 | 10/2006 | Frank et al. | |
| 7,155,729 B1* | 12/2006 | Andrew et al. | 719/318 |
| 7,263,545 B2 | 8/2007 | Digate et al. | |
| 7,287,097 B1 | 10/2007 | Friend et al. | |
| 7,293,242 B2 | 11/2007 | Cossey | |
| 7,296,244 B2 | 11/2007 | Martinez et al. | |
| 7,299,259 B2 | 11/2007 | Petrovykh | |
| 7,305,453 B2 | 12/2007 | Awamoto et al. | |
| 7,310,781 B2 | 12/2007 | Chen et al. | |
| 7,337,210 B2 | 2/2008 | Barsness | |
| 7,370,278 B2 | 5/2008 | Malik | |
| 7,383,308 B1 | 6/2008 | Groves et al. | |
| 7,383,356 B2 | 6/2008 | Gargi | |
| 7,386,841 B2 | 6/2008 | Huang | |
| 7,392,306 B1* | 6/2008 | Donner et al. | 709/224 |
| 7,395,500 B2 | 7/2008 | Whittle et al. | |
| 7,434,048 B1 | 10/2008 | Shapiro et al. | |
| 7,451,218 B2 | 11/2008 | Malik et al. | |
| 7,478,336 B2 | 1/2009 | Chen et al. | |
| 7,487,550 B2* | 2/2009 | Todd | 726/27 |
| 7,496,633 B2 | 2/2009 | Szeto et al. | |
| 7,600,189 B2* | 10/2009 | Fujisawa | 715/765 |
| 7,617,458 B1 | 11/2009 | Wassom et al. | |
| 7,640,293 B2 | 12/2009 | Wilson et al. | |
| 2001/0034244 A1 | 10/2001 | Calder et al. | |
| 2002/0049633 A1 | 4/2002 | Pasquali | |
| 2002/0055975 A1 | 5/2002 | Petrovykh | |
| 2002/0065110 A1* | 5/2002 | Enns et al. | 455/566 |
| 2002/0069264 A1 | 6/2002 | Pasquali | |
| 2002/0080179 A1 | 6/2002 | Okabe et al. | |
| 2002/0103902 A1 | 8/2002 | Nagel et al. | |
| 2003/0050932 A1 | 3/2003 | Pace et al. | |
| 2003/0065723 A1 | 4/2003 | Kumhyr et al. | |
| 2003/0208491 A1 | 11/2003 | Pasquali | |
| 2004/0093563 A1 | 5/2004 | Pasquali | |
| 2004/0111478 A1 | 6/2004 | Gross et al. | |
| 2004/0143633 A1 | 7/2004 | McCarty | |
| 2004/0186918 A1* | 9/2004 | Lonnfors et al. | 709/250 |
| 2004/0205134 A1 | 10/2004 | Teven et al. | |
| 2005/0021652 A1 | 1/2005 | McCormack | |
| 2005/0049960 A1 | 3/2005 | Yeager | |
| 2005/0086290 A1 | 4/2005 | Joyce et al. | |
| 2005/0086640 A1 | 4/2005 | Kolehmainen et al. | |
| 2005/0097061 A1 | 5/2005 | Shapiro et al. | |
| 2005/0172241 A1 | 8/2005 | Daniels et al. | |
| 2005/0198581 A1 | 9/2005 | Soderberg et al. | |
| 2005/0203892 A1 | 9/2005 | Wesley et al. | |
| 2005/0210401 A1 | 9/2005 | Ketola et al. | |
| 2005/0257128 A1 | 11/2005 | Pasquali et al. | |
| 2005/0262521 A1 | 11/2005 | Kesavarapu | |
| 2006/0025091 A1 | 2/2006 | Buford | |
| 2006/0085796 A1 | 4/2006 | Hoerle et al. | |
| 2006/0095524 A1 | 5/2006 | Kay et al. | |
| 2006/0271526 A1 | 11/2006 | Charnock et al. | |

FOREIGN PATENT DOCUMENTS

| | | |
|---|---|---|
| WO | WO 00/49545 | 8/2000 |

OTHER PUBLICATIONS

Kolehmainen et al., U.S. Appl. No. 60/513,050, titled: Systems and Methods for Facilitating Software Development and Communications Efficacy, filed Oct. 21, 2003, 39 pages.

In U.S. Appl. No, 11/282,916, filed Nov. 18, 2005, Office Action dated Jul. 9, 2009, to be published by the USPTO, 26 pages.

In U.S. Appl. No. 11/282,217, filed Nov. 18, 2005, Office Action dated Aug. 5, 2009, to be published by the USPTO, 19 pages.

In U.S. Appl. No. 11/090,741, Non-Final Office Action dated Jan. 7, 2010, to be published by United States Patent and Trademark Office, 51 pages.

In. U.S. Appl. No. 11/282,217, Non-Final Office Action dated Jan. 4, 2010, to be published by United States Patent and Trademark Office, 20 pages.

In U.S. Appl. No. 11/090,402, Non-Final Office Action dated Aug. 6, 2009, to be published by United States Patent and Trademark Office, 24 pages.

Muller, Nathan J., "Focus on OpenView," Chapters 8, 9 and 10 (Mar. 1995).

Corporate Portals Letter, vol. 1, No. 10, Oct. 2000.

Focus on HP OpenView, Nathan J. Muller, Mar. 1995, Chapters 8, 9, 10.

RealPresenter Plug-in, User's Guide Version 5.0, Real NetworksInc., 1998, 29 pages.

Netscape 7.1 Upgrade Guide, 8 pages, 2003.

Lambert, Karine, Authorized Officer, European Patent Office, International Search Report, Application No. PCT/US2008/066184, mailed Nov. 6, 2008, 15 pages.

Lambert, Karine, Authorized Officer, European Patent Office, International Search Report, Application No. PCT/US2008/066188, mailed Nov. 6, 2008, 15 pages.

Sun Microsystems, Inc., Java™ Network Launching Protocol & API Specification (JSR-56) Version 1.5 [Online] May 2001, XP007906066. Retrieved from the Internet: URL: http://cds.sun.com/is-bin/INTERSHOP.enfinity/WFS/CDS-CDS Developer-Site/en_US/-/USD/verifyItem-Start/jnlp-1_5-mr-spec.pdf?Bundled-LineItemUUID=gvVIBe.pDpoAAAEdPR1iMS9Y&OrderID=0Q51Be.pB8IAAAEdMBliMS9Y&ProductID=fL__ACUFB1v0AAA-EY2U45AXuV&FileName=/jnlp-1_5-mr-spec.pdf> (Retrieved on Nov. 24, 2008), pp. 1-85.

Sun Microsystems, Inc., "Auto Downloading JREs using Java™Web Start and JavaTM Plug-in" [Online] Feb. 2007, pp. 1-3, XP007906067. Retrieved from the Internet: URL: hitp://web.archive.org/web/20070207051627/http/java.sun.com/j2se/1.5.0/docs/guide/javaws/developersguide/autod1.03.06.html> (Retrieved on Nov. 28, 2004).

Sun Microsystems, Inc., Packaging JNLP Applications in a Web Archive, Java™ Web Start 1.4.2 [Online] Aug. 2005, pp. 1-11, XP007906068. Retrieved from the Internet: URL: http://web.archive.org/web/20050828081147/http://java.sun.com/j2se/1.4.2/docs/guide/jws/downloadservletguide.hml> (Retrieved on Nov. 28, 2004).

Phillip J. Windley, "REST: Representational State Transfer," Chapter 11, Mar. 22, 2005, pp. 237- 261.

Office Action, U.S. Appl. No. 11/090,402 mailed Nov. 19, 2007, 9 pages.

Final Office Action, U.S. Appl. No. 11/090,402 mailed Jul. 22, 2008, 18 pages.

Office Action, U.S. Appl. No. 11/090,402 mailed Jan. 9, 2009, 18 pages.

Office Action, U.S. Appl. No. 11/089,699 mailed Jun. 25, 2008, 122 pages.

Office Action, U.S. Appl. No. 11/089,699 mailed Dec. 15, 2008, 8 pages.

Office Action, U.S. Appl. No. 11/089,699 mailed Jul. 9, 2009, 10 pages.

Office Action, U.S. Appl. No. 11/090,741 mailed Aug. 28, 2008, 26 pages.

Final Office Action, U.S. Appl. No. 11/090,741 mailed Mar. 6, 2009, 40 pages.
Office Action, U.S. Appl. No. 11/280,714 mailed Jun. 11, 2009, 27 pages.
Office Action, U.S. Appl. No. 11/282,916 mailed Jan. 28, 2009, 15 pages.

Final Office Action, U.S. Appl. No. 11/282,916 mailed Jul. 9, 2009, 26 pages.
Office Action, U.S. Appl. No. 11/282,217 mailed Feb. 5, 2009, 16 pages.

* cited by examiner

SYSTEM AND METHOD FOR PROVIDING NOTICES TO USERS OF A COMPUTER PROGRAM IN A FLEXIBLE WAY

RELATED APPLICATIONS

This application claims the benefit of U.S. provisional application Ser. No. 60/629,454 entitled, "SYSTEM AND METHOD FOR PROVIDING NOTICES TO USERS OF A COMPUTER PROGRAM IN A FLEXIBLE WAY" Filed on Nov. 18, 2004 by Ethan Malasky, Stephanie Goss, Kevin Lynch, David Calaprice and Alexander Magee, and now expired; U.S. provisional application Ser. No. 60/629,455 entitled, "METHOD AND APPARATUS FOR COMMUNICATING DATA AMONG TWO OR MORE PROGRAMS" filed on Nov. 18, 2004 by Thomas Reilly, Kevin Lynch, Ethan Malasky and Alexander Magee, and now expired; and U.S. provisional application Ser. No. 60/629,503, entitled "METHOD AND APPARATUS FOR COMMUNICATING INSTANT MESSAGE INFORMATION BETWEEN AN INSTANT MESSAGING NODE AND ONE OR MORE PROGRAMS" Filed on Nov. 18, 2004 By Daniel Dura and Kevin Lynch, and now expired, each having the same assignee as the present application and each is incorporated by reference herein in its entirety.

The subject matter of this application is related to the subject matter of U.S. patent application Ser. No. 11/090,402 pending entitled, "System and Method for Communicating Information Over a Network" filed on Mar. 25, 2005 by Kevin Lynch, David Calaprice, Ethan Malasky and Tracy Stampfli, and U.S. patent application Ser. No. 11/089,699, (now U.S. Pat. No. 7,913,248) entitled, System and Method for Installing One or More Programs and at Least a Portion of Their Environment" filed on Mar. 25, 2005 by Kevin Lynch, Tracy Stampfli, Peter Grandmaison and Rebekah Hash, and U.S. patent application Ser. No. 11/090,741 (now U.S. Pat. No. 7,934,210) entitled, "System and Method for Updating One or More Programs and Their Environment" filed on. Mar. 25, 2005 by Tracy Stampfli and Rebekah Hash, each having the same assignee as this application and all are hereby incorporated herein by reference in its entirety.

FIELD OF THE INVENTION

The present invention is related to computer software and more specifically to computer software for user interfaces.

BACKGROUND OF THE INVENTION

Computer software can provide information to a user. One vehicle for providing information to users is a message, provided to notify the user of some event. The event may be a stock price breaking through a certain threshold, a period of time that has elapsed since a prior event, another user known to the user of the computer system logging into a server or any other event.

When computer software detects the event, some computer software provides a message to the user notifying the user of the event. The manner of notification that the computer software may use may be limited by the environment in which the computer software operates. For example, some operating systems allow the software to request that the operating system display a message box that contains text and one or more buttons allowing the user to communicate information to the program. A communication program can use this capability to request the operating system to display a message upon the occurrence of a loss of communications with a modem, such as "Communications with the modem have unexpectedly terminated. Would you like to reestablish communications with this modem?". The communication program may also instruct the operating system to display three push buttons, with legends "Yes", "No" and "Cancel" to allow the user to provide feedback. When the operating system displays the message, it will also display the buttons, and when the user selects one of the buttons, the operating system can inform the program which button was selected upon request by the program.

In the example above, the operating system may enforce a rule that when a message box is displayed, no other user input may be received by the operating system until the user clicks one of the buttons in the message box. Such a message can be annoying to the user, especially a user using an environment that allows multiple programs to be running at the same time. The user may be working on an important task in one program and may not wish to be interrupted by another program.

Additionally, this type of a messaging facility can be inappropriate for many applications that wish to provide messages that may not require immediate attention. Some messages may not require any attention at all, while still other messages may be important enough to simply notify the user of their existence and allow the user to decide whether to view it immediately or, if the user is busy, to wait until a later time. However, many environments do not provide a suitable facility for these types of messages.

If the operating system or other operating environment provides no other messaging facilities suitable for the type of messages to be provided to the user, to provide different types of messages, the developer of each application program is required to write a facility for displaying the type of message desired by the developer, provided the environment in which the program displaying the message can supply the native resources the developer requires to implement the type of message desired. However, even if it is possible for the developer to write a facility that can display the message, the time required to research the manner in which the message can be provided and write the facility may be significant, increasing the cost of providing such a facility or preventing it from being provided. Thus, it is desirable to provide in the environment itself a facility that can provide a variety of different types of messages so that it can be used by several programs.

Even if this problem is solved, other problems with respect to messages remain. One such problem is the fact that messages can annoy the user, particularly if they arise at an inopportune time. Even if the message does not require an immediate response, the user may nevertheless not wish to be interrupted by messages at certain times, but at other times, the user may wish to see the messages. A provision may be made in each program the user is using to disable these kinds of messages, but disabling and reenabling the messages in many different applications can be cumbersome for the user.

If the developers of different programs must write their own messaging facilities, the provision of messages to a user by individual programs can cause confusion and clutter if each program uses a slightly different way of providing messages to the user. If the user is required to interpret and respond to messages from each program in a slightly different manner, the user may get confused when receiving messages from different programs. Furthermore, if messages are displayed in different parts of the screen by different programs, it can cause a cluttered appearance on the screen and take up too much screen space to allow the user to view the messages while working on other application programs.

Some programs are made up of independently or semi-independently running sub-programs. When a triggering event for a message is detected by one of the sub programs or by another facility, it can be desirable to notify some or all of the sub-programs. To perform this function, the developer of the program is required to learn what may be obscure messaging facilities provided by the environment, code their own, or use a combination of existing messaging facilities and coding. This process is time consuming and difficult, and thereby raises the cost of the program or inhibits the developer of the program from implementing such communication at all.

What is needed is a system and method that can provide a facility for messages having different requirements of notification to the user in an environment in which multiple programs can run and therefore can be used by a variety of programs, without requiring the developers of the programs to individually code the facility, that provides a consistent message look and operation across the different programs in the environment without requiring separate areas in which messages from different programs must be displayed, that allows the user a single point of control over the notification process for the messages received, and can provide indications of messages to various component parts of a program.

SUMMARY OF INVENTION

A system and method provides a facility for presenting to a user different types of messages from one or more programs. The system and method receives each message as part of a notice, and each notice may be marked by a program with any of one or more types to allow different types of messages corresponding to the notice to be presented to the user by the system and method in different ways, yet in a consistent fashion across multiple programs. The messages corresponding to one or more types of notices are displayed by the system and method in an area in which messages from various programs are displayed, so that the user may review at his or her leisure, without any notification that such messages are available. For messages corresponding to the one or more other types of notices, the system and method can interrupt the user with one or more different types of notifications that a message is available to be reviewed, yet the system and method accepts commands from the user to suppress such notifications that a new message is available to be reviewed. The developer of the program can thus control whether the system and method can provide a notification to the user for each message it provides, yet the user ultimately controls whether such notification is provided. The portion of the program that triggered the sending of the notice may enclose with the notice a data structure to be sent to other portions of the program and the system and method distributes the data structure to such other portions to allow any portion to take an action based on the data structure in the notice.

DETAILED DESCRIPTION OF A PREFERRED EMBODIMENT

Figure 1:
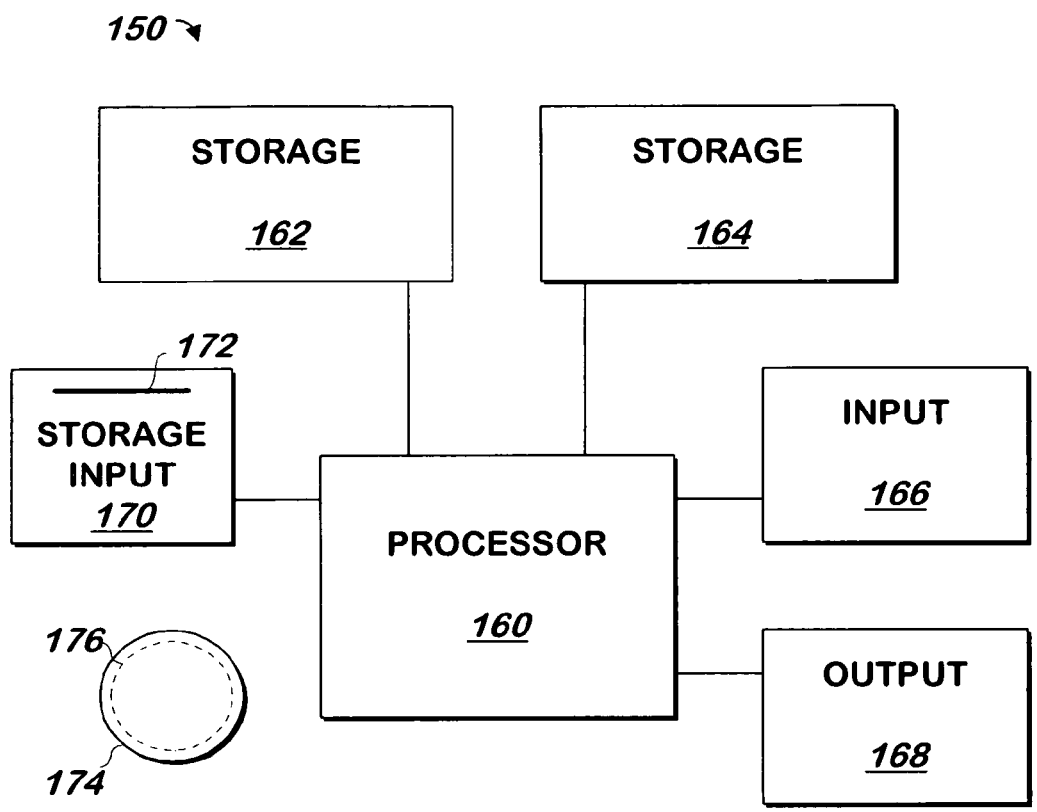
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Overview of System

Figure 2:
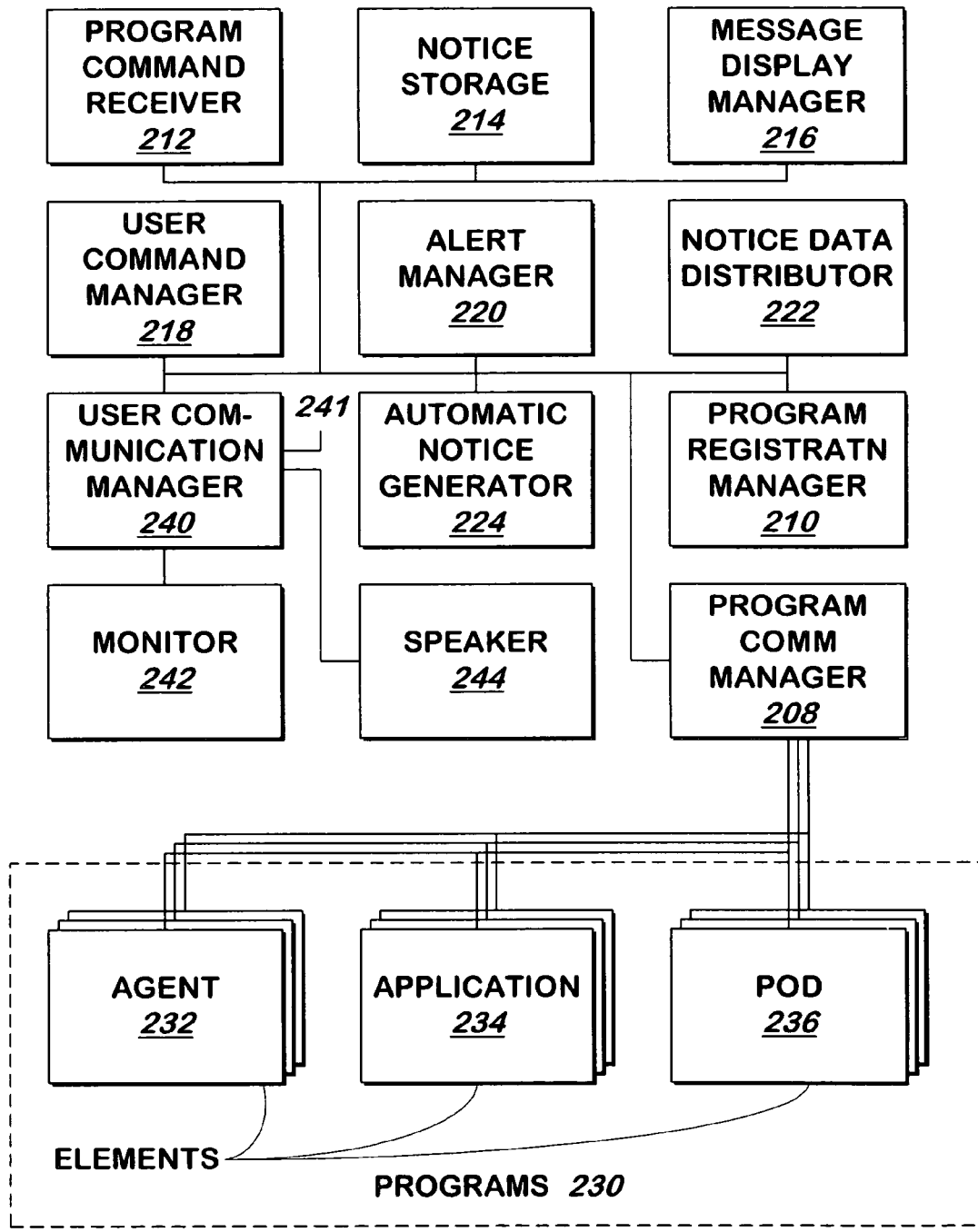
FIG. 2 is a block schematic diagram of a system for providing messages and notifications of certain new messages and for distributing a corresponding data structure according to one embodiment of the present invention.

Referring now to FIG. 2, a system for providing messages, and notifications of certain new messages and for distributing data associated with the message among other components of the same program as the sender of the message is shown according to one embodiment of the present invention. One or more programs 230 provide notices containing such messages to be provided to users via monitor 242. When a message is initially displayed, the user may also receive one or more types of notifications that a message is available if the notice, as specified by the program generating it, so indicates, and if the user has allowed or otherwise enabled such notices.

Registration of Programs

In one embodiment, each of the programs 230 consists of an agent 232, one or more applications 234 and one or more pods 236 as described in the related applications, and each agent 232, application 234 and pod 236 is referred to herein as an "element" of the program. In one embodiment, one such element 232-236 in each of the programs 230, or each of the elements 232-236 of each of the programs 230, registers the elements 232-236 of a program to program registration manager 210 via program communication manager 208. Program communication manager 208 handles the communication with each of the elements 232-236 of the programs 230. In one embodiment each type of element (an agent, application or pod) communicates with program communication manager 208 via a manager for that type (e.g. all pods communicate via a pod manager) which are not shown to avoid cluttering the figure. The operation of such managers is described in the relation application.

Program registration manager 210 issues and stores into notice storage 214 identifiers of each of the elements 232-236 of each program, associated with one another so as to identify each of the elements 232-236 as belonging to a single one of the programs 230.

In one embodiment, program registration manager 210 provides the identifiers of each of the elements to each such element 232-236 for use in identifying itself as described below. In another embodiment, each element provides its own identifier and/or the identifier of the program to which it belongs to program registration manager 210 when the program is registered and program registration manager 210 uses such identifier or identifiers to identify each such element 232-236 instead of issuing identifiers to each of the elements 232-236. In such embodiment, each program may be downloaded by program registration manager 210 from a web server, and program registration manager 210 ensures that only those elements 232-236 downloaded from a single domain such as an Internet domain are allowed to identify themselves as being an element 232-236 of the same program.

A Program Element Sends a Notice.

When a program element 232-236 wishes to send a message to a user, and optionally send a data structure corresponding to the notice to other elements of the same program as the element 232-236 sending the message, that element 232-236 sends a notice to program command receiver 212 via program communication manager 208. Program communication manager 208 forwards the notice to program command receiver 212 along with the identifier of the program element 232-236 from which the notice was received, which may be received from the element 232-236 with the notice, or implied from the communication channel on which the notice was received, such channel having been stored in notice storage 214 and associated with the element 232-236 when the element is registered as described above.

As used herein, a notice is a data record that contains text of the message intended for the user, an indication of the type of notification (including "no notification") the element sending the notice wishes the user to receive with the message, and an optional data structure that is to be sent to other elements 242-246 of the same program, and may contain other information, as described herein. As noted above, notices may be received with the identifier of the element 232-236 and may contain an element-generated identifier used to uniquely identify the message from other messages it sends, or program command receiver 212 may add to the message and provide to the element 232-236 from which the notice was received, the unique identifier for the message in response. Program command receiver 212 receives the notice and stores the identifier of the element that sent the notice, the unique identifier of the message (if such things were not part of the notice), and the notice in notice storage 214. Program command receiver 212 may also add to the notice the date and time of receipt of the notice, which it retrieves from the operating system (not shown) when the notice is received. In one embodiment, notices are stored in notice storage 214 in the order in which they are received with the most recently received message first.

Program command receiver 212 signals message display manager 216 and provides some or all of the notice, or its identifier, to alert manager 220 so that alert manager 212 can retrieve the notice, instead of receiving it.

Display of Message in the Notice

Message display manager 216 provides for display, the message to a messaging window that displays messages from all of the programs 230 that provide notices as described above, even programs supplied by other vendors that may not be related to one another. The message is provided to the display screen of the monitor 242 via user communication manager 240, which handles the details of the display required by the operating system (not shown), as described in more detail below.

Notification of Messages Received

In one embodiment, the notices received from the programs 230 contain an indication as to whether the user should be notified that a new message is available to be viewed, and at least this indication, and optionally, the unique identifier, is received or retrieved by alert manager 220 and this indication defines the type of notification, if any, the user should receive when the message is displayed as described herein. If the indication in the notice identifies the notice as one for which the user should not be notified, alert manager 220 disregards the notice: the message will be displayed to the user as described herein, but alert manager 220 will not provide a separate notification as described herein, provided the user has enabled that type of notification as described in more detail below. If the indication in the notice identifies the notice as one for which the user should be so notified, alert manager 220 checks notice storage 214 for an indication as to whether the user has disabled such notifications.

If the user has disabled such notifications, (or, in the embodiment in which a user may disable some or all types of such notifications as described below, if the user has disabled all such notifications) alert manager 220 disregards the notice for the purpose of providing notification of the message contained therein. In this case, in one embodiment, alert manager 220 may, however, set a flag in notice storage 214 that indicates that a message has been received during such time as the user has disabled such notifications. When the user reenables them from a state in which all types of notifications are disabled, to a state where at least one type of notification is enabled, using command manager 218 as described below, command manager 218 signals alert manager 220, which checks all of the notices in message storage 212 for the flag. If any flags are present, alert manager 218 clears all such flags, and provides a notification of each type enabled and corresponding to any notice with a flag.

If the user has indicated that the user wishes to receive notifications of messages for which the program has indicated that a notification of the message should be sent, alert manager 220 signals operating system (not shown) to provide the notification. There may be more than one type of notification, and in one embodiment, the user, the program, or both, may control not only whether any notification is provided to the user with the message, but which types of notifications are employed.

To facilitate the explanation of notifications, it may be helpful to briefly discuss the display screen the user sees according to one embodiment of the present invention. Although the following is a brief description, additional detail will be provided below.

Figure 3:
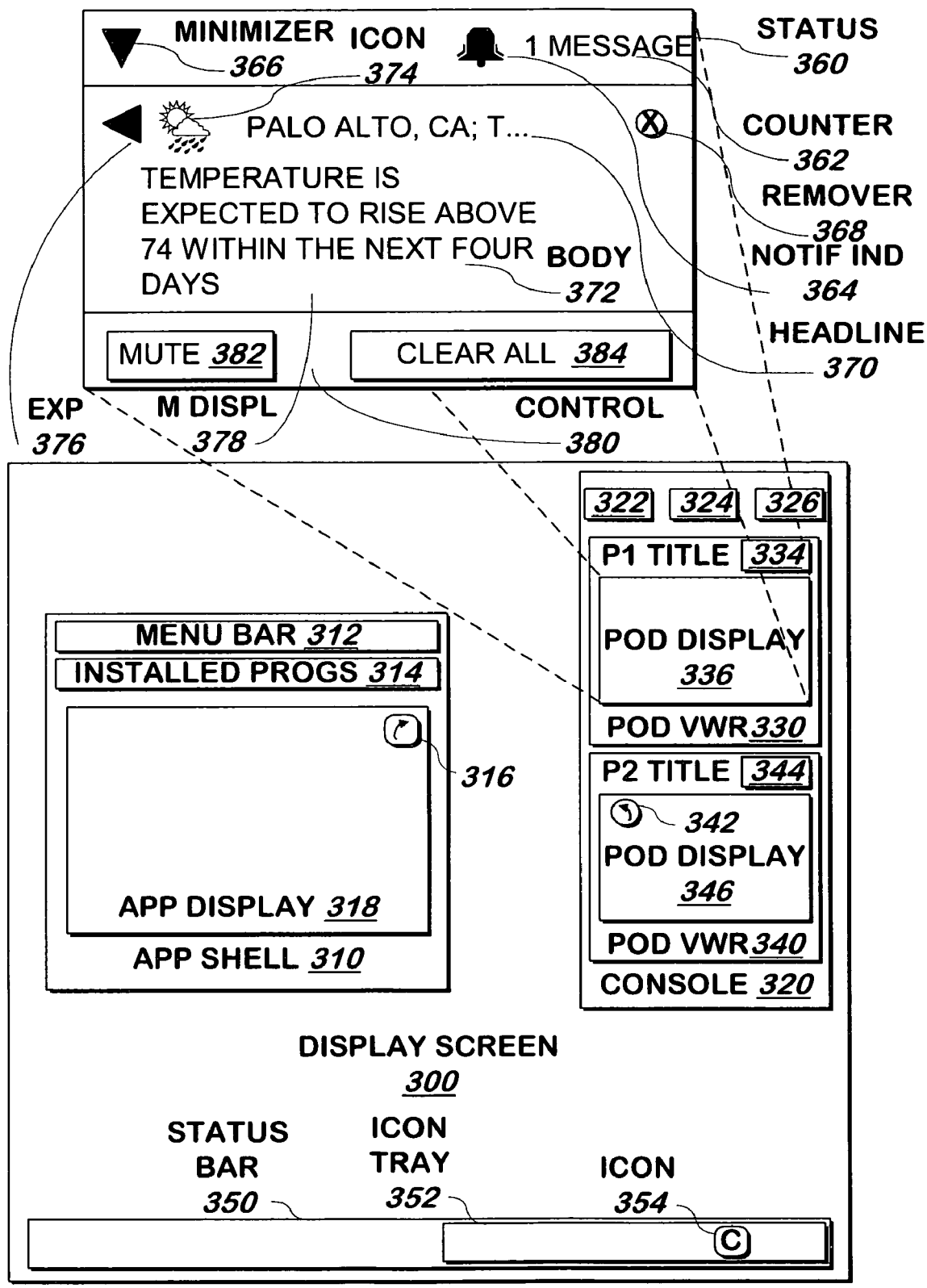
FIG. 3 is a display screen on which an application shell and console are displayed and showing detail of a messaging user interface according to one embodiment of the present invention.

FIG. 3 illustrates a representative display screen 300 on which an application shell 310 and console 320 are displayed according to one embodiment of the present invention. Referring now to FIGS. 2 and 3, in one embodiment, the messages are displayed in the console 320 of the display screen 300 of monitor 242. Specifically, the messages may be displayed in the pod display area 336 of the uppermost pod viewer 330, which may be reserved for messages, or may be reserved for messages upon startup. In one embodiment, the user is allowed to rearrange the pod viewer 330 to a different position within the console 320. Other pod viewers 340 contain pod display areas 342 in the console 320. The console 320, pod viewers 330, 340 and the pod display areas 332, 342 are described in the related applications.

One type of notification that may be provided under the direction of alert manager 220 is a visual notification. Operating system (not shown) may provide a visual notification via icon 354 in the icon tray 352. The icon tray is displayed in the status bar 350 at the bottom of the window in which the operating system is displayed, although the user may move the status bar 350 to any other edge of the operating system window. The operating system window shown in FIG. 3 occupies the entire display screen 300.

Different operating systems may provide visual notifications via an icon in different manners. The conventional WINDOWS XP operating system provides visual notifications via icons in the icon tray by displaying a balloon help message, that appears above an icon 354 registered by the program. For such a system, alert manager 220 registers, on system startup, icon 354 as a resource with the operating system (not shown) and then provides a Shell_NotifyIcon( ) API to operating system (not shown) to display the icon 354. To display a visual notification, alert manager 354 provides title and body text to be displayed in the balloon as part of a Shell_NotifyIcon( ) API to operating system (not shown) and operating system (not shown) displays the balloon with the text as described above.

Other operating systems provide visual notifications via an icon 354 in other manners. For example, the icon 354 in the MACINTOSH operating system family can be made to appear to jump up and down to indicate a message is available. To register the icon 354 with such operating system, alert manager 220 provides the icon as a resource to operating system (not shown) and to cause the icon 354 to jump as a visual notification, alert manager 220 sends to operating system (not shown) the NMInstall( ) API command.

Another type of notification that may be provided to the user under control of alert manager 220 is an audible notification. In one embodiment, alert manager 220 also directs the operating system to send an audible notification to the user that a message is available by causing operating system (not shown) to ring a bell or play a sound, via user communication manager 240 and speaker 244 in addition to, or instead of, providing the visual notification described above. Alert manager 220 may pre-register the sound with the operating system (e.g. by storing it in a file) and then referencing it when it sends the audible notification by sending a command to the operating system.

As described in more detail below, the form of notification the user receives may be user selectable, to allow the user to receive such notifications audibly, visually or both. In such embodiment, alert manager 220 notifies the user according to the form or forms of notification enabled as stored in notice storage 214 as described in more detail herein. In one embodiment, the notice received from the program element 232-236 includes a type that defines which types of notifications should be provided to the user (e.g. 0-none, 1-visual only, 2-audible only, 3-visual and audible). Alert manager 220 initiates the forms of notifications, if any, so specified by the notice that also correspond to user-enabled types of notifications that are indicated in this notice storage 214 as described below.

User Control of Notifications.

In one embodiment, a user may enable or disable some or all types of notifications that a new message has been received. To disable or enable such notifications, the user signals user command manager 218 via a conventional input device 166 of FIG. 1, such as a keyboard and/or mouse as described above, coupled via input 241 to user communication manager 240, which passes such signal to user command manager 218. In one embodiment, the user signals user command manager 218 via any of a number of user interface elements displayed on the display screen 300 as described in more detail below. The user may also signal user command manager 218 using menu bar 312 of the application shell window 310. Application shell window 310 contains application display area 318 into which the user interface of applications 234 are displayed one at a time, based on a selection the user made in the installed programs area 314 as described in more detail in the related applications. In one embodiment, an icon in the installed programs area 314 may also be used to signal user command manager 218.

When so signaled, user command manager 218 provides a user interface in the application display area 318. This user interface indicates whether the user will be notified when notices arrive that are indicated by the program that sent them as having messages for which the user should be notified, and/or indicates the one or more types (e.g. audibly and/or visually) of notifications the user should receive upon arrival of the message. To provide such use interface, user command manager 218 retrieves one or, more indicators of such information that are stored in notice storage 214, which may be memory or disk storage or both, and displays the indicators retrieved in a user interface element such as a check box that allows the user to make any changes. In one embodiment, a default set of indicators may be provided when the program is installed, enabling all forms of notification that a new message has been received.

The user may use the user interface elements provided by command manager 218 to make a selection changing any or all of these indicators and user command manager 218 stores the indicators into notice storage 214. If the indicators are maintained in disk storage, they can persist from one session to the next, and if the indicators are stored in memory, user command manager 218 may also store them in disk storage or store them onto disk upon system exit or when any changes are made, and may read them from disk storage back into memory upon system startup. When alert manager 220 receives the indications of the type of notifications that should be provided (such indications being supplied as part of the notice), it checks the indicator or indicators in notice storage 214, notifying the user of the message only in the form or forms that are both specified in the notice and enabled by the user.

In one embodiment, if the user changes the indicators from a state in which no notifications of any kind are provided to a different state, user command manager 218 signals alert manager 220. Alert manager 220 checks the flags described above in each message in notice storage 214. For all such messages, alert manager 220 clears all flags and provides a notification to the user in the manner or manners the user just enabled if at least one message having a flag set corresponded to that type of notification.

Form of Notice Screen.

A representative display of messages and the user interface surrounding them is shown in the expanded detail area in the upper part of FIG. 3. The operation of this display and user interface is performed by message display manager 216 except as otherwise noted herein. Message display manager 216 may be organized as a pod as described in the related applications in one embodiment.

Status area 360 contains message counter 362 that indicates the number of messages currently stored in notices in notice storage. Each time message display manager 216 is signaled, it counts the notices in notice storage 214 and displays in message display area 378 the numbers of messages from such notices.

In one embodiment, the messages in each notice include a message headline and a message body, both stored in notice storage 214 when signaled as described herein, message display manager 216 displays the headline 370 for all messages in notice storage (or all messages not marked as suppressed) in message display area 378, with the most recently received message headline 370 first. If there are more headlines than can fit in message display are 378, message display manager 216 provides a user interface element such as a scroll bar to allow the user to scroll through headlines for all notices. Each message displayed by message display manager in message display area 378 may include message headline 370. Although only one message is shown in message display area 378, there may be any number of messages from any number of different programs as described above, all displayed in message display area 378. Message display manager 216 also displays adjacent to the message headline 370 some or all of the message body in any remaining space allocated for the message headline 370 when signaled as described above. The message body in the space for the message header 370 is separated from the actual headline by a semicolon that message display manager 216 inserts, and in one embodiment, a different font is used by message display manager 216 to display the message headline than it uses to display the message body, for example, by displaying the message headline 370 in a bold version of a font, and displaying the message body 372 in a non-bold version of that same font. If the entire message body can not be so displayed in the space available for the message headline 370, message display manager 216 adds ellipses to the end of the portion of the message that can be displayed in the space available for the message headline, less the space required for the ellipses. In one embodiment, message display manager 216 so truncates the text of the message body only at the end of a word. The user may click oh the message headline, or perform the other actions described below and message display manager 216 receives a notification of the click or other action and displays the message body 372 which, as noted above, may otherwise not be initially displayed, except for any portion displayed in the leftover space for the message header as described above.

An icon 374 is displayed by message display manager 216 to the left of the message headline 370 to provide a visual indicator of the program from which the message was provided. A different icon may be registered by each program 230 to program registration manager 210, by each program 230 sending a registration command that includes the icon that should be used for that program 230. In one embodiment, the portion of the program 230 that registers the icon may be the application 234 of the program, although in one embodiment, an installation portion (not shown) of the program 230 registers the icon when the program is installed. The registration command is received by program command receiver 212 and forwarded to program registration manager 210, which stores the icon and the identifier of the program in an icon storage area of notice storage 214. In such embodiment, each notice includes the identifier of the program element that sent it, and when message display manager 216 displays the message from the notice, it retrieves the program element identifier from the notice, identifies the program to which it corresponds using the information in notice storage 214, looks up in the icon storage area of notice storage 214 the icon corresponding to the identifier of the program corresponding to the notice, retrieves the icon and displays it as described and shown herein. In another embodiment, each notice includes the icon, which message display manager 216 displays as described and shown herein.

Message display manager 216 displays one message expansion indicator 376 to the left of icon 374 for each message. Message expansion indicator 376 contains an icon that points to the left when the message body 372 is displayed, and otherwise contains a number that indicates the order in which the message was received when the message body 372 is not displayed. When the user clicks on the indicator when it is a number, message display manager 216 receives an indication that it has been clicked, and in response, changes the icon in message expansion indicator 376 to the arrow and displays the body of the message 372 as shown in the Figure and described above. Other messages that may be displayed in message display area 378 may be moved down on the display by message display manager 216 (with the lower most messages scrolling off the screen) to make room for the display of the body of the message. To identify whether a particular message expansion indicator is clicked, message display manager 216 maintains a list of the coordinates of the message expansion indicators, which it maintains as it changes the display of messages as described herein (e.g. due to a message being added, deleted, or a user scrolling through the messages using a scroll control operated by message display manager 216) using conventional techniques.

The user may also view the body of the message by clicking on headline 370, in which case message display manager 216 receives an indication of the click, and based on the location of the click, performs the same functions as described above with respect to the click of message expansion indicator 376 as described above. Message display manager 216 maintains the coordinates of the area of each message headline 370 in the display as the display of messages is changed, and uses this information and the coordinates at which the mouse was clicked to determine the particular message on whose headline the user clicked.

Suppression of the display of the message body 372 may be requested by the user by clicking on message expansion indicator 376 during such time as it contains the arrow icon. When a user clicks within pod display 336, message display manager 216 receives the coordinates of the click using a coordinate system such as one starting at 0,0 in the upper left hand corner of the pod viewer 330 and identifies the message expansion indicator 376 on which the user clicked and then identifies its state. If it is in the state corresponding to the display of the body of its message, message display manager 216 changes the icon back to the number in the message expansion indicator 376, ceases the display of the message body 372 and moves up in the display (and adjusts their area coordinates accordingly) message headline 370 to maintain a uniform distance between message headlines 370 (and the associated other displayed components described herein) being displayed below that message.

In one embodiment, each message contains its own remover 368. Remover 368 allows the user to request that a message be removed from the message display area 378. When the user clicks remover 368 for a message, message display manager 216, which maintains the area in which the remover 368 for each message is displayed, identifies the message corresponding to the remover 368 clicked, and complies with the request, either by removing the notice containing that message from notice storage 214 or by marking it as suppressed so that message display manager 216 will not display it when it displays messages as described herein. Message display manager 216 then redisplays the messages in message storage 214 that are not marked as suppressed as described herein.

Clear all button 384, which clicked, causes message display manager 216 to remove from the message display area 378 all messages corresponding to notices in notice storage 214, either by deleting the corresponding notices in notice storage 214 or marking them all as suppressed and message display manager 216 redisplays the messages, which, because there will be none or all will be suppressed, will cause message display manager 216 to display no messages.

Notification indicator 364 is displayed by message display manager 216 when notifications are enabled, and hidden or otherwise indicated when notifications are disabled as described above. Message display manager retrieves any or all of the indicators in notice storage and displays indicator 364 in accordance with any such indicator being enabled. In one embodiment, the lines to the side of the bell that indicate that it is ringing are displayed by message display manager 216 when notifications are enabled and omitted when notifications are disabled. In other embodiments, there may be more than one notification indicator 364, for example, one for each type of notification displayed by message display manager 216 in accordance with its indicator in notice storage 214.

If the user presses, minimizer button 366, message display manager 216 is notified using conventional techniques. Minimizer button 366 allows the user to collapse the pod display area 336 by omitting the display of message display area 378 and control bar 380. When message display manager 216 receives the notification that minimizer button 366 has been pressed, message display manager 216 causes the display of a different arrowhead icon that forms the button 366 with one that points to the right side. Message display manager 216 then collapses the display of pod display 336 to show only the status bar 360 and collapses the pod viewer 330 around the status bar 360. A pod manager (not shown) described in the related applications that manages the display of console 320 then moves any other pod viewers, such as pod viewer 340, in the console 320 up, to maintain a constant separation between pod viewers 330, 340. If the user presses the minimizer button 366 again, message display manager 216 is again notified, and message display manager 216 returns the pod display 336 to the general appearance and function described herein before the user pressed the minimizer button the first time, except that message display manager 216 retrieves from notice storage 214 and redisplays the messages as described above to allow the display of any messages received since the pod display 336 was collapsed as described above.

Control bar 380 contains mute button 382, which, when selected by the user, causes message display manager 216 to receive an indication that the mute button 382 has been pressed. When pressed, message display manager 216 indicates to user command manager 218 that the user wishes to disable notifications of new messages, and user command manager 218 disables all notifications by changing the indicators in notice storage 214 to a disabled state as described above. Although one mute button 382 is shown, there may be different buttons to disable different types of notifications as described above, such as one button to disable audible notification and another button to disable visual notification, and message display manager 216 may indicate to command manager 218 which button was pressed so that command manager can disable notifications of that type by changing the state of the corresponding indicator in notice storage 214.

In one embodiment, when the user presses the mute button 382, message display manager 216 changes the text of the button 382 to indicate that pressing the button again will enable all types of notifications (or in the case in which separate buttons are used for each type of notification, the button indicates that pressing it will enable that type of notification), and message display manager 216 internally maintains the status of the button. If the user presses the button, message display manager 216 toggles the status it maintains and indicates to command manager 218 the new status. If the status is such that notifications have been muted, message display manager 216 so indicates to command manager 218 and command manager 218 performs the functions described above. If the status is such that notifications have been re-enabled, message display manager 216 so indicates to command manager 218, which re-enables all types of notifications, or places the status of notifications back to the point it was before they were muted using 382, which command manager 218 saves before disabling them and restores to enable them.

In one embodiment, P1Title and control 334 are not displayed in the pod viewer 330 in which the messages are displayed. Message display manager 216 or another component of the system and method that controls the display of the pod viewers described in the related applications handles this suppression of P1Title and control 334 when so commanded by message display manager 316. Controls 322, 324, 326 and 344 operate as described in the related applications.

Program Control of Messages.

In one embodiment, a command may be received by program command receiver 212 (in the manner described above regarding receipt of notices) from the program element 232-236 that provided the notice (or any other element 232-236 of the same program) to delete the notice, suppress the message from being displayed in message display area 378 but preserve it in notice storage 214, or to change the text of a message corresponding to a notice stored in notice storage 214. In one embodiment, the command contains an identifier of the notice or an identifier of the notice and the program or program element from which it was received.

Program command receiver 212 receives the command, and using the identifier or identifier received and those stored with the notices, locates in notice storage 214 the notice referenced in the command. If the command is a command to delete the notice, program command receiver 212 deletes the notice, and if the command is to suppress display of the message, it marks the corresponding notice in notice storage 214 as suppressed. Program command receiver 212 then signals message display manager 216, which displays the messages corresponding to notices, or corresponding to notices not marked as suppressed, such display being performed in the manner described above.

If the command is a command to change the message in the notice, program command receiver 212 changes the message in the notice in notice storage 214 in accordance with the command and, signals message display manager 216, which updates the display with the new message as described above.

In one embodiment, commands received by elements 232-236 may include a command to renotify the user, and if such command is received by program command receiver 212, it signals alert manager 220, which notifies the user as described above.

Automatic Deletion of Notices.

In one embodiment, each notice includes an expiration date and time or an expiration period, after which the notice is to be discarded. Periodically, user command manager 218 retrieves the current date and time from the operating system (not shown), scans the notices stored in notice storage 214, and identifies notices for which the expiration date and time, or the date and time of receipt plus the expiration period is prior to the current date and time. If it locates any such notice, in one embodiment, user command manager 218 deletes the notice.

Redistribution of Notices.

In one embodiment, when a notice is received, it can contain a data structure to be distributed to other elements of the program from which the notice was received. In such embodiment, the data structure included with the notice is distributed to the program elements 232-236 of the same program from which the notice was received, or distributed to all such program elements 232-236 other than the one from which the notice was received. The notice may have a field indicating that the data structure should be sent to such other elements 232-236 or the data structure may be sent to such other elements 232-236 automatically if the data structure is received with the notice.

When program command receiver 212 receives a notice and identifier of the program element 232-236 from which it was received as described above if so indicated for redistribution as described above, it provides some or all of the notice (or its unique identifier) and the identifier of the program element 232-236 that sent the notice to notice data distributor 222. Notice data distributor 222 receives the notice and identifier determines the program with which the program element 232-236 is associated in the registration area of notice storage 214, and looks up the identifiers of the program elements that are associated in notice storage 214 as being an element 232-236 of the same program as the element corresponding to the identifier notice data distributor 222 receives from program command receiver 212.

Notice data distributor 222 then extracts the data structure (and optionally, other portions of the notice) from the notice, reformats it into a redistributed notice message, and provides the message to program communication manager 208 with the identifiers it looked up as described above. In one embodiment, notice data distributor 222 only performs the functions described above if the notice contains an indication that the notice is to be redistributed or contains the data structure, which may be an optional component of the notice. In one embodiment, notice data distributor 222 adds to the redistributed notice message the identifier of the program element that sent the notice from the identifiers it looked up, and in one embodiment, notice data distributor 222 adds such identifier only if a field in the original notice indicates that such identifier should be sent.

Program communication manager 208 receives the redistributed notice message and identifiers, and sends the redistributed notice message containing the data structure to the program elements 232-236 corresponding to the identifiers it receives, optionally using the information stored for each such program element 232 in the registration area of notice storage 214 when the program elements 232-236 were registered as described above. The redistributed notice message allows the other elements 232-236 of the same program as the element that sent the notice to be informed of the notice and the data structure and optional identifier of the program element from which the notice was received, contained in such message may indicate to such other elements how they may respond to or otherwise process the notice.

As noted above, program elements 232-236 from the same internet domain may register with program registration manager 210 and supply a program identifier and program registration manager 210 associates in a registration area of message storage 212 an identifier of the program element with the program identifier but restricting registering program elements using the same program identifier to those downloaded from the same internet domain, as described in the related applications. To identify the other program elements, of the same program, notice data distributor 222 looks up in the registration area of notice storage 214 the identifier of the program element from which the notice was received, identifies the program identifier, and then looks up other program elements that registered that same program identifier.

Notification of Deleted Messages.

In one embodiment, notices are deleted as described herein by providing to notice data distributor 222 a data structure that include the identifier of the notice, and a reason code that the notice is being deleted (e.g. enumerated values indicating that the notice expired, an element of a program 230 requested deletion, the user deleted the message, etc). In such embodiment, it is notice data distributor 222 that physically deletes the notice from notice storage 214. However, before it deletes the message, notice data distributor identifies the element that sent the notice from the notice itself, and also identifies the other elements 232-236 of the same program as described above. Notice data distributor 222 then provides the identifier of the message and the reason code identifying the reason for the deletion, to all of the elements of the program corresponding to the element that sent the notice, to indicate that the notice is being deleted and the reason therefor.

Automatic Notices.

In one embodiment, an element 232-236 of a program may request that a notice be automatically generated upon the occurrence of an event, such as the end of a period of time beginning at the time which the request was provided or received. In such embodiment, the notice it sends to application manager receiver 212 contains a field that describes the criteria under which the notice should be generated, in addition to the other notice information as described above. If the field contains a criteria, application command receiver 212 optionally assigns the identifier or identifiers, and stores, in the manner described above, the notice in a separate area of notice storage 214 that is not retrieved by message display manger 216. Application command receiver 212 does not signal or otherwise notify message display manager 216 or alert manager 220, but may add other information such as the date and time of receipt, program element identifier, etc. to the notice as described above. It provides the identifier of notice and the identifier of the program element 232-236 from which the notice was received to automatic notice generator 224.

Automatic notice generator 224 retrieves from the separate area of notice storage 214 the notice, using the identifier parses the criteria field and interprets the criteria. Automatic notice generator 224 identifies whether the criteria has been met, and if so, it removes it from any special area of notice storage 214, and removes the criteria from the notice (or otherwise indicates that the criteria has been met) and stores the notice (or its identifier) and the identifier of the element 232-236 that originally sent the notice, the date and time of receipt, or the current date and time, and any other information with the notices in notice storage 212 that are read by message display manager 216. Automatic notice generator 224 signals message display manager 216 and provides the notice in whole or in part to alert manager 220 both of which operate as described above.

If the criteria in the notice has not been met, automatic notice generator 224 either monitors (periodically or continuously) conditions described in the criteria, or causes another component of the computer system in which automatic notice generator 224 is running (or a different computer system) to determine when the criteria has been met. For example, if the criteria specifies a period of time from receipt of the notice, automatic notice generator 224 may set an operating system timer to signal automatic notice generator 224 when the period of time has elapsed. When the criteria specified in the notice has been met, automatic notice generator 224 then removes the criteria and stores the notice with the other notices read by message display manager 216 as described above, in notice storage 214, signals message display manager 216 and provides some or all of the notice to alert manager 220, which each operate as described above.

Figure 4A:
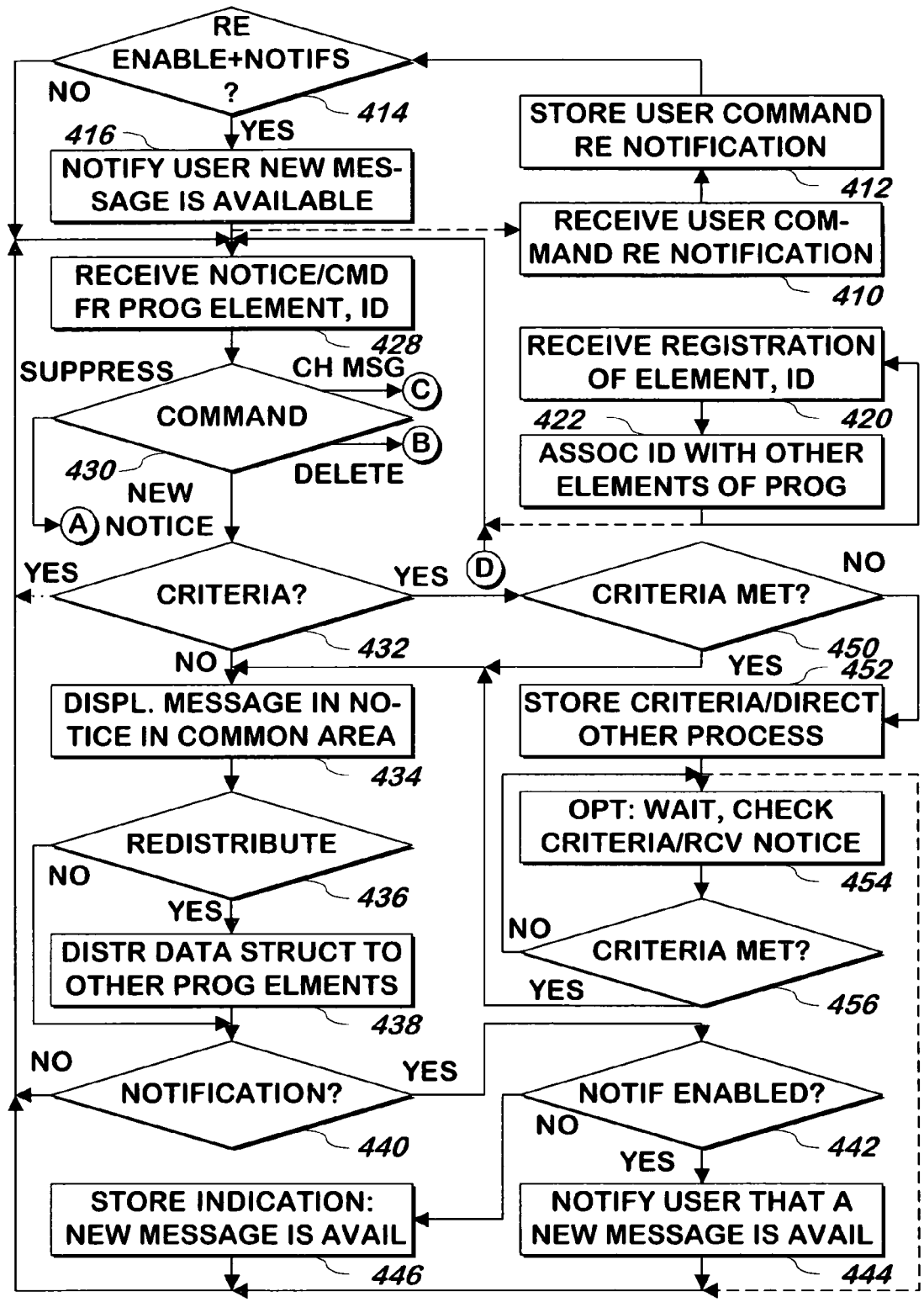
FIG. 4, consisting of FIGS. 4A and 4B, is a flowchart illustrating a method of providing messages and notifications of certain new messages as well as distributing a corresponding data structure according to one embodiment of the present invention.
Figure 4B:
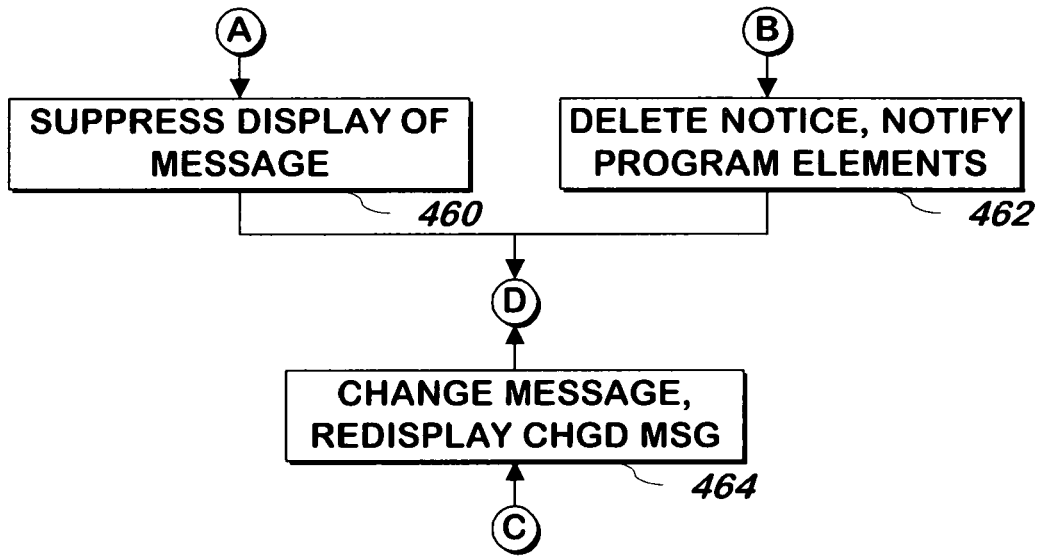
Figure 4:
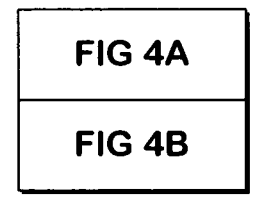

Referring now to FIG. 4, consisting of FIGS. 4A and 4B, a flowchart illustrating a method of providing messages and notifications of certain new messages is shown according to one embodiment of the present invention. A command is received 410 from a user that either enables or disables all notifications of messages or one or more types (e.g. audible or visual) of notifications of messages.

Information corresponding to the command (such as whether notifications are enabled or disabled or whether certain types of notifications are enabled or disabled) are stored 412 for use as described below. If the command is a command that takes the notifications from an entirely disabled state (e.g. both audible notifications and visual notifications are disabled) to one in which at least some form is enabled and a message has been received during the time that notifications were completely disabled 414, the user may be notified that a message is available 416 and the method continues at step 428 and otherwise 414, the method continues at step 428. At any time, the user may send an additional command, starting the process at step 410, as indicated by the dashed line in the figure.

As part of a separately running process, an element of a program may register itself or be registered along with an identifier of the element 420, and the identifier is associated with other identifiers of other elements of the same program 422, for example, by allowing the element or the program to specify the program or elements but verifying that all elements identified as being part of the same program had been downloaded from the same Internet domain, and the method continues at step 420 and 428.

At step 428, a notice or command is received from a program element, along with the identifier of the element, which may be inferred instead of being explicitly received. Step 428 may include providing an identifier of the notice to the program that supplied it, or the notice may contain an identifier of the message.

If what is received is a new notice 430, if the notice contains a criteria for when the message corresponding to the notice should be provided 432, the method continues at step 450 described below, and also at step 428, and otherwise 432, a message in the notice is displayed in a common area in which messages from notices received by other programs are also displayed 434. The other programs may be supplied by different vendors. If the notice contains, or indicates that it contains, a data structure that should be redistributed 436, the data structure is distributed 438 to all of the elements of the program or the elements of the program other than the element from which the notice was received, the program being indicated by the identifier of the element that is received with the notice in step 428, or being part of the notice, and the method continues at step 440, and otherwise 436, the method continues at step 440.

At step 440, if the notice contains an indication that the user should be notified that a new message has been received, the method continues at step 442 and otherwise 440, the method continues at step 428. At step 442, if notifications are enabled, at least in part, by the user, the user is notified using methods corresponding to all enabled types of notifications 444 and the method continues at step 428, and otherwise 442, an indication is stored that a message has been received during the period in which notifications have been completely disabled for use in step 414 and the method continues at step 428.

At step 450, if the criteria in the notice are met, the method continues at step 432 using that notice and otherwise 450, the criteria may be stored, or used to direct one or more other processes for purposes of notification as described above, or both 452 and the method continues at step 454. Steps 454 and 456 may operate as a separately running process as indicated by the dashed line in the Figure, and so step 428 may also follow step 452. At step 454, an optional wait period may be allowed to elapse, and one or more characteristics, such as whether a period of time has elapsed, may be checked to determine whether the criteria have been met or an indication that the criteria have been met may be received from the one or more other processes. If the criteria has been met 456, the method continues at step 434 using the notice corresponding to the criteria that has been met, and otherwise 456, the method continues at step 454.

If, at step 428, a command is received indicating that a specified message should be suppressed 430, the display of the specified message is suppressed 460 and the method continues at step 428. If a command is received in step 428 indicating a notice should be deleted 430, the notice is deleted 462 and the method continues at step 428. Step 462 may include the distribution to program elements corresponding to the program that sent the notice, of the identifier of the message being deleted and the reason for the deletion, in this case, via program element request. In one embodiment, an identifier of the element that requested the deletion is also provided with such a distribution.

If a command is received in step 428 indicating a message should be changed, the message is changed and the changed message (or all messages) is redisplayed 464 and the method continues at step 428.

What is claimed is:

1. A method of displaying a message, comprising:
   receiving from a first program the message and a first indication regarding whether a user should be notified that the message is available;
   receiving from the user a second indication regarding whether at least one form of notification is acceptable;
   displaying the message in an area in which a message from a second program can be displayed;

responsive to the first indication and the second indication, providing a notification to the user that the message is available;

receiving a third indication that each of a plurality of elements correspond to the first program and providing first information identifying the plurality of elements and associating such elements with the first program;

wherein the message is received from at least one of the plurality of elements corresponding to the first program in a manner allowing the identification of said at least one of the plurality of elements that sent the message providing second information corresponding to said identification of said at least one of the plurality of elements;

receiving command input, from the at least one of the plurality of elements corresponding to the first program, including third information different from the message intended for distribution to at least one of the plurality of elements of the first program; and providing the third information different from the message received to at least a subset of the plurality of the elements corresponding to the first program, said subset of the plurality comprising at least one of the plurality of elements different from the at least one of the plurality of elements from which the information was received.

2. The method of claim 1, wherein the displaying the message step is responsive to a criterion received from the first program.

3. The method of claim 1, additionally comprising:
receiving fourth information useful for verifying that each of the plurality of elements correspond to the first program; and
verifying that each of the plurality of elements correspond to the first program responsive to the fourth information information useful for verifying that each of the plurality of elements correspond to the first program received.

4. The method of claim 1, wherein at least one of the first indication and the second indication contains an audio component and a visual component.

5. The method of claim 1 additionally comprising:
receiving a command to change the message to a changed message;
ceasing the display of the message; and
displaying the changed message in the area.

6. A system for displaying a message, comprising:
a processor; and
at least one non-transitory computer-readable storage device comprising instructions that, when executed by the processor, cause the system to generate:
a program command receiver having a first input for receiving from a first program the message and a first indication regarding whether a user should be notified that the message is available, the program command receiver providing at a first output the message and the first indication;
a user command manager having a second input for receiving from the user a second indication regarding whether at least one form of notification is acceptable, the user command manager providing the second indication at a second output;
a message display manager having a third input coupled to the first output for receiving the message, the message display manager providing via a third output the message in a manner causing said message to be displayed in an area of a display screen in which a message from a second program can be displayed;
an alert manager having a fourth first input coupled to the first output for receiving the first indication and a fifth input coupled to the second output for receiving the second indication, the alert manager providing, responsive to the first indication received at the fourth input and the second indication received at the fifth input, via a fourth output a notification to the user that the message is available;
an application registration manager having a sixth input for receiving a third indication that each of a plurality of elements correspond to the first program, the application registration manager providing at a fifth output first information identifying the plurality of elements and associating such elements with the first program;
wherein the message is received from at least one of the plurality of elements corresponding to the first program by the program command receiver in a manner allowing the identification of said at least one of the plurality of elements that sent the message, and the program command receiver is additionally for providing at the first output second information corresponding to said identification of said at least one of the plurality of elements;
wherein the program command receiver additionally receives at a seventh input from the first program, third information different from the message intended for distribution to at least one of the plurality of elements of the first program, and the program command receiver is additionally for providing at the first output said third information different from the message; and
a notice data distributor having an eighth input coupled to the first output for receiving at least the third information different from the message and the second information corresponding to said identification of said at least one of the plurality of elements, and a ninth input coupled to the sixth output for receiving the first information identifying the plurality of elements and associating such elements with the first program, the notice data distributor providing at a sixth output the third information different from the message received at the eighth input to at least a subset of the plurality of the elements corresponding to the first program, said subset of the plurality comprising at least one of the plurality of elements different from the at least one of the plurality of elements from which the third information was received.

7. The system of claim 6, wherein:
the program command receiver additionally receives from the first program at the first input and provides at the first output a criterion;
the message display manager additionally receives at the third input, the criterion; and
the message display manager provides the message at the third output responsive to the criterion received at the third.

8. The system of claim 6, wherein:
the application registration manager is additionally for receiving at a tenth input fourth information useful for verifying that each of the plurality of elements correspond to the first program;
the application registration manager is additionally for verifying that each of the plurality of elements correspond to the first program responsive to the fourth information received at the tenth input; and
the first information identifying the plurality of elements and associating such elements with the first program is provided at the sixth output by the application registration manager responsive to said verifying.

9. The system of claim 6, wherein at least one of the first indication and the second indication contains an audio component and a visual component.

10. The system of claim 6, wherein:
the seventh input is additionally for receiving a command to change the message to a changed message, and the program command receiver is additionally for providing at the first output at least a portion of the command received at the seventh input;
the third input is additionally for receiving the at least the portion of the command; and
the message display manager is additionally for ceasing the display of the message and displaying the changed message in the area, responsive to the command received.

11. A computer program product comprising a non-transitory computer useable storage device having computer readable program code embodied therein for displaying a message, the computer program product comprising computer readable program code devices configured to cause a computer system to:
receive from a first program the message and a first indication regarding whether a user should be notified that the message is available;
receive from the user a second indication regarding whether at least one form of notification is acceptable;
display the message in an area in which a message from a second program can be displayed;
responsive to the first indication and the second indication, providing a notification to the user that the message is available;
receive a third indication that each of a plurality of elements correspond to the first program and provide first information identifying the plurality of elements and associate such elements with the first program;
wherein the message is received from at least one of the plurality of elements corresponding to the first program in a manner allowing the identification of said at least one of the plurality of elements that sent the message, the method further comprising providing second information corresponding to said identification of said at least one of the plurality of elements;
receive command input, from the at least one of the plurality of elements corresponding to the first program, including third information different from the message intended for distribution to at least one of the plurality of elements of the first program; and
provide the third information different from the message received to at least a subset of the plurality of the elements corresponding to the first program, said subset of the plurality comprising at least one of the plurality of elements different from the at least one of the plurality of elements from which the information was received.

12. The computer program product of claim 11, wherein the computer readable program code devices configured to cause the computer system to display the message are responsive to a criterion received from the first program.

13. The computer program product of claim 11, additionally comprising computer readable program code devices configured to cause the computer system to:
receive fourth information useful for verifying that each of the plurality of elements correspond to the first program; and
verify that each of the plurality of elements correspond to the first program responsive to the third indication received and the fourth information useful for verifying that each of the plurality of elements correspond to the first program received.

14. The computer program product of claim 11, wherein at least one of the first indication and the second indication contains an audio component and a visual component.

15. The computer program product of claim 11 additionally comprising computer readable program code devices configured to cause the computer system to:
receive a command to change the message to a changed message;
cease the display of the message; and
display the changed message in the area.

\* \* \* \* \*

UNITED STATES PATENT AND TRADEMARK OFFICE
CERTIFICATE OF CORRECTION

Page 1 of 1

PATENT NO.        : 8,117,623 B1
APPLICATION NO.   : 11/282266
DATED             : February 14, 2012
INVENTOR(S)       : Ethan Malasky et al.

It is certified that error appears in the above-identified patent and that said Letters Patent is hereby corrected as shown below:

Claim 3, Column 17, Line 35-36, delete "information information" and insert -- information --, therefor.

Claim 6, Column 18, Line 1, delete "fourth first" and insert -- fourth --, therefor.

Claim 7, Column 18, Line 56, delete "third." and insert -- third input --, therefor.

Signed and Sealed this
Tenth Day of April, 2012

David J. Kappos
*Director of the United States Patent and Trademark Office*